United States Patent [19]

Robertson

[11] Patent Number: 5,333,254
[45] Date of Patent: Jul. 26, 1994

[54] METHODS OF CENTERING NODES IN A HIERARCHICAL DISPLAY

[75] Inventor: George G. Robertson, Palo Alto, Calif.

[73] Assignee: Xerox Corporation, Stamford, Conn.

[21] Appl. No.: 770,196

[22] Filed: Oct. 2, 1991

[51] Int. Cl.$^5$ ............................................. G06F 15/62
[52] U.S. Cl. ..................................... 395/155; 395/156
[58] Field of Search ................................ 395/155–161, 395/137–138, 152; 340/709–710, 723, 747; 345/121–123

[56] References Cited

U.S. PATENT DOCUMENTS

| | | | |
|---|---|---|---|
| 4,710,763 | 12/1987 | Franke et al. | 340/723 |
| 4,752,889 | 6/1988 | Rappaport et al. | 324/513 |
| 4,772,882 | 9/1988 | Mical | 340/709 |
| 4,821,211 | 4/1989 | Torres | 340/747 |
| 4,931,783 | 6/1990 | Atkinson | 345/156 |
| 4,974,174 | 11/1990 | Kleinman | 345/156 |
| 5,065,347 | 11/1991 | Pajak et al. | 395/159 |
| 5,155,806 | 10/1992 | Hoeber et al. | 345/157 |
| 5,230,063 | 7/1993 | Hoeber et al. | 345/156 |
| 5,276,785 | 1/1994 | Mackinlay et al. | 395/127 |
| 5,276,789 | 1/1994 | Besaw et al. | 395/155 X |

FOREIGN PATENT DOCUMENTS 0435601 7/1991 European Pat. Off. ...... H04N 1/387

OTHER PUBLICATIONS

Edell, "The Tinkertoy Graphical Programming Environment", IEEE Trans. on Soft. Eng., Aug. 1988, pp. 1110–1115.
MacDraw Pro User's Guide, Claris Corp., 1991, pp. 28–37.
Pope, S. T., Goldberg, A., and Leibs, D., "The ParcPlace Systems Navigator Applications and Frameworks." set of slides presented at ACM SigGraph Symposium on User Interface Software, Oct. 1988, Banff, Canada, pp. 1–30.
Halasz, F. G., Moran, T. P., and Trigg, R. H., "NoteCards in a Nutshell," in Proceedings of CHI+GI 1987 (Toronto, Apr. 5–9, 1987), ACM, New York, 1987, pp. 45–52.
Furnas, G. W., "Generalized Fisheye Views," *CHI 1986 Proceedings*, ACM, Apr. 1986, pp. 16–23.
Snowbird Conference Center stationery dated Oct. 5, 1990 and entitled "Fanya (Dec) Montalvo," one sheet.

*Primary Examiner*—Heather R. Herndon
*Assistant Examiner*—John E. Breene

[57] ABSTRACT

An image is presented that includes a node-link structure. The nodes are in rows, and each row extends across a centering line. The rows are in sequence along the centering line, with links between nodes in adjacent rows. When a user requests a centering operation for an indicated node, a sequence of images is presented, each including a row that appears to be a continuation of the row with the indicated node and that includes a continued indicated node that appears to be a continuation of the indicated node. The rows appear to be shifted, bringing the continued indicated nodes toward the centering line, until a final shift locks the continued indicated node into position at the centering line. The positions of the indicated node and a subset of the continued indicated nodes together can define an asymptotic path that begins at the position of the indicated node and approaches the centering line asymptotically until the final shift occurs. The displacements between positions can follow a logarithmic function, with each displacement being a proportion of the distance from the preceding position to the centering line. Each step can include an animation loop. If the node-link structure represents a hierarchical body of data with each node representing a data item, the indicated node's descendants and ancestors within the hierarchy can also be shifted to the centering line. Each node can be rectangular, and the nodes in each row can be separated by equal offsets to provide compact rows. Each node can be a selectable unit, so that the user can request a centering operation by selecting a node, such as with a mouse click.

26 Claims, 7 Drawing Sheets

METHODS OF CENTERING NODES IN A HIERARCHICAL DISPLAY

BACKGROUND OF THE INVENTION

The present invention relates to interactive user interface techniques. More specifically, the invention relates to techniques that present an image of a hierarchical node-link structure and respond to requests from a user to modify the image to make part of the structure more visible.

Pope, S. T., Goldberg, A., and Leibs, D., "The ParcPlace Systems Navigator Applications and Frameworks," presented at ACM SigGraph Symposium on User Interface Software, October 1988, Banff, Canada, pp. 1-30, is a set of slides describing Navigator, a window/menu-based user interface. FIG. 1 on page 3 shows several possible representations of hierarchies and lists. Other examples of hierarchical representations appear on pages 4-7, 11-13, 15-19, 21, 23, 27, and 29-30. FIG. 13 on page 13 and several other figures show examples of arrows at the boundary of a hierarchical representation that can be selected to scroll the entire representation.

Halasz, F. G., Moran, T. P., and Trigg, R. H., "NoteCards in a Nutshell," in Proceedings of CHI+GI 1987 (Toronto, Apr. 5-9, 1987), ACM, New York, 1987, pp. 45-52, describe NoteCards, a system in which notecards containing an arbitrary amount of information are connected by links. Page 48 indicates that NoteCards requires that every notecard be filed in a FileBox, a card in which other cards can be filed, and that the FileBox structure form a true hierarchy, i.e. a directed acyclic graph. FIG. 3 on page 49 shows a browser of a FileBox hierarchy which, as shown, includes nodes that are parallel rectangles. The rectangles are not of equal length, but the left sides of a set of siblings are aligned. A small scale representation of the complete hierarchy appears in the upper left hand corner of FIG. 3.

Rappaport et al., U.S. Pat. No. 4,752,889, describe a graphic display that shows links between chunks of knowledge, such as in FIGS. 7 and 8. As shown and described in relation to FIG. 9, the user can, with mouse clicks, obtain a display of links from a displayed chunk of knowledge to other chunks of knowledge, which are added to the display. Screen scrolling mechanisms allow movement from one area of the overall graph to another.

Furnas, G. W., "Generalized Fisheye Views," CHI '86 Proceedings, ACM, April 1986, pp. 16-23, describes fisheye views that provide a balance of local detail and global context. Section 1 discusses fisheye lenses that show places nearby in great detail while still showing the whole world, showing remote regions in successively less detail; a caricature is the poster of the "New Yorker's View of the United States." Section 3 describes a degree of interest (DOI) function that assigns, to each point in a structure, a number telling how interested the user is in seeing that point, given the current task. A display can then be made by showing the most interesting points, as indicated by the DOI function. The fisheye view can achieve, for example, a logarithmically compressed display of a tree, as illustrated by FIG. 4 for a tree structured text file. Section 4 also describes fisheye views for botanical taxonomies, legal codes, text outlines, a decision tree, a telephone area code directory, a corporate directory, and UNIX file hierarchy listings. Section 5 indicates that a display-relevant notion of a priori importance can be defined for lists, trees, acyclic directed graphs, general graphs, and Euclidean spaces; unlike the geographic example which inspired the metaphor of the "New Yorker's View," the underlying structures need not be spatial, nor need the output be graphic. FIG. 6 shows a fisheye calendar.

SUMMARY OF THE INVENTION

One aspect of the invention deals with a basic problem in presenting node-link structures, such as a tree representing a hierarchical body of data. Such structures can be useful in editing or otherwise accessing a body of data. Because such bodies can include many items of data, a node-link structure with a node for every data item can be large and complicated. As a result, it may be difficult for the user to find a part of the structure of interest.

Some conventional techniques for presenting tree displays permit a user to scroll through the entire display, as described above in relation to Rappaport et al., U.S. Pat. No. 4,752,889. Such scrolling is slow, and the user can only see a part of the tree structure. Other techniques provide a reduced resolution image of the tree, as noted above in relation to the Halasz et al. article, an approach that shows structure but does not show content. Still other techniques distort or truncate the contents of the tree, as exemplified by the fisheye displays described in the above-noted Furnas article.

This aspect is based in part on the observation that conventional techniques do not reliably provide an important type of information, referred to herein as "global context detail." For example, in a hierarchical node-link structure, global context detail For a given node can include the contents of its ancestors, siblings, and descendants within a hierarchical node-link structure. Conventional scrolling techniques do not ensure that the user can see ancestors, siblings, and descendants of a given node. Conventional reduced resolution images do not ensure that the user can see the contents of related nodes. Conventional fisheye techniques provide global context detail, but distort or truncate nodes in order to do so. Therefore, conventional techniques do not ensure that the user will obtain global context detail without distorting the nodes and their relationships.

This aspect is further based on the discovery of a new technique that can be used to alleviate this problem. The technique presents node-link structures in which each node is in one of a set of row-like arrangements or rows. The rows of a structure extend across a centering line of the structure. Each structure includes links between nodes in adjacent rows, and the structure is perceptible as lying on a plane-like surface. A user can request centering of an indicated node in the structure. If the indicated node is not at the centering line, the technique moves the indicated node to the centering line by shifting its row.

The technique can be refined in various ways. Other rows of the structure can also be shifted so that ancestor nodes and descendant nodes of the indicated node are also moved to the centering line. Descendant nodes can be positioned together within a row and can be centered about the centering line when their ancestor is indicated. The rows can be shifted in a sequence of steps, with each row moving according to a logarithmic function. The final step for each row can be a larger step to provide the perception that motion is completed and the row is locked in its final position.

The invention is advantageous because it permits efficient presentation and search of a large, complicated node-link structure and provides global context detail for a node of interest. In response to a user request indicating a node, a hierarchical path that includes the indicated node, its ancestors, and its center descendants is automatically centered by shifting rows of nodes. The resulting node-link structure produces an effect similar to the fisheye displays described above in relation to the Furnas article. This effect can be achieved, however, by changing the spatial relationships between nodes without distorting or truncating the nodes, so that global context detail is preserved.

The following description the drawings, and the claims further set forth these and other aspects, objects, features, and advantages of the invention.

BRIEF DESCRIPTION OF THE DRAWINGS FIG. 1 is a schematic flow diagram showing shifting of a row of nodes in a node-link structure that lies in a plane-like surface.

DETAILED DESCRIPTION

A. Conceptual Framework

Figure 1:
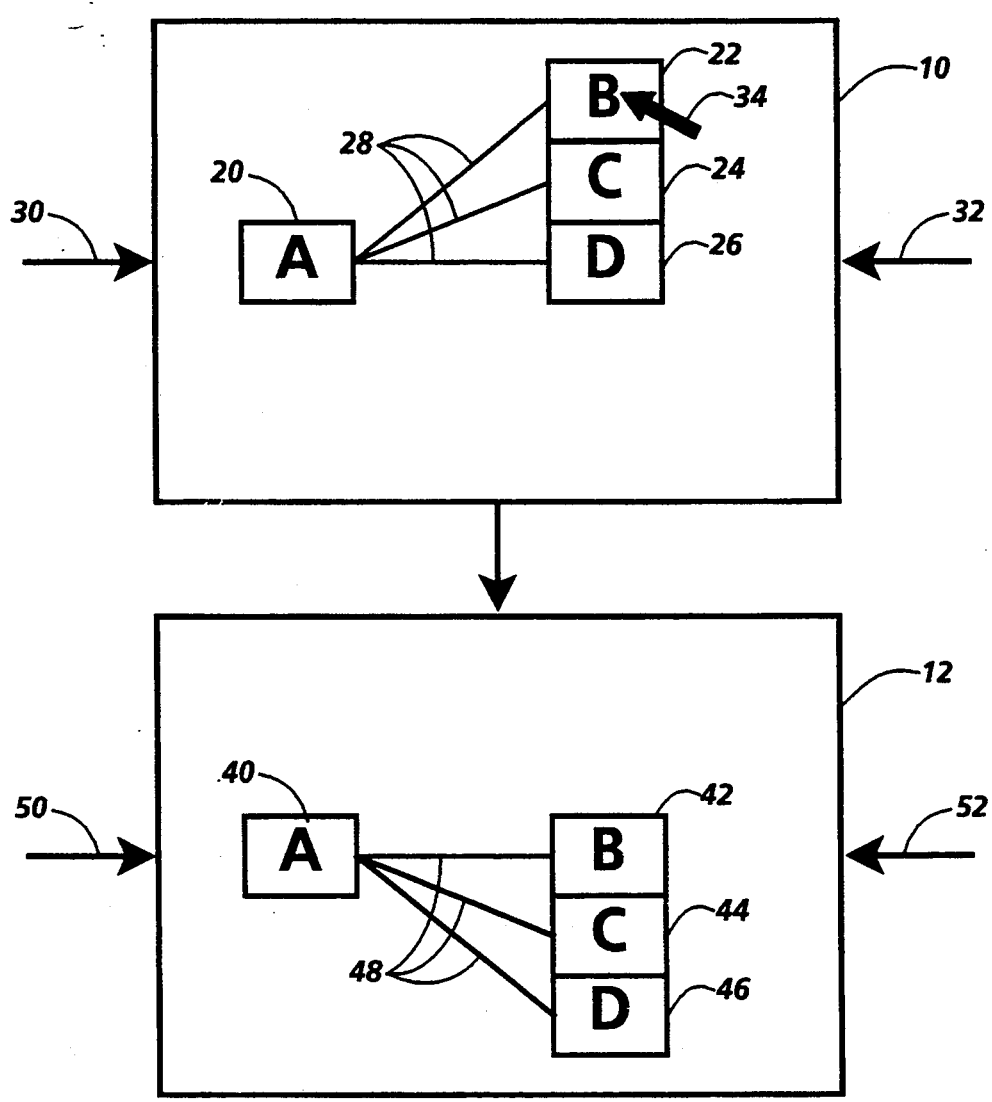

The following conceptual framework is helpful in understanding the broad scope of the invention, and the terms defined below have the indicated meanings throughout this application, including the claims.

"Data" refers herein to signals that indicate information. "Data" includes data existing in any physical form, and includes data that is transitory or is being stored or transmitted. For example, data could exist as an electromagnetic or other transmitted signal or as a signal stored in electronic, magnetic, or other form.

A "data processing system" is a system that processes data. A "data processor" or "processor" is any component or system that can process data, and may include one or more central processing units or other processing components. A processor performs an operation or a function "automatically" when it performs the operation or function independent of concurrent human control.

Any two components are "connected" when there is a combination of circuitry that can transfer data from one of the components to the other. "Memory" is any component, combination of components, or system that can store data, and may include local and remote memory and input/output devices.

A processor "accesses" data in memory by any operation that retrieves or modifies the data, such as by reading or writing a location in memory that includes the data. A processor can be "connected for accessing" data by any combination of connections with local or remote memory or input/output devices that permits the processor to access the data.

A "user input device" is a device such as a keyboard or a mouse that can provide signals based on actions of a user. The data from the user input device may be a "request" for an operation, in which case the system may perform the requested operation in response.

An "image output device" is a device that can provide an image as output. A "display" is an image output device that provides output that defines an image in a visible form. A display may, for example, include a cathode ray tube; an array of light emitting, reflecting, or absorbing elements; a structure that presents marks on paper or another medium; or any other structure capable of defining an image in a visible form. The visible pattern presented by a display is a "displayed image" or simply "image." To "present an image" on a display is to operate the display so that a viewer can perceive the image.

A wide variety of display techniques for data processing systems are available including, for example, various graphical user interfaces, but, despite their diversity, these techniques tend to have certain common characteristics. One fundamental common characteristic is that a display produces human perceptions. In this application, the term "display feature" refers to any human perception produced by a display.

A "display object" or "object" is a display feature that is perceptible as a coherent unity. An image "includes" an object if presentation of the image can produce perception of the object.

A "structure" is a display feature that includes other display features within it, all of which appear to be connected into a unity.

A "node-link structure" is a structure that includes display features that can be distinguished into "nodes" that are localized and "links" that extend between and connect the nodes. In the limit, a node can be localized to a just perceptible point and a link can be a just perceptible line extending between nodes, but all that is necessary for a node-link structure is that the nodes are sufficiently localized and the links are sufficiently extended that nodes and links are distinguishable.

A "hierarchical structure" is a structure that is perceptible as having a number of levels. A hierarchical node-link structure, for example, could have a number of levels of nodes with links connecting each node on a lower level to one of the nodes on an upper level.

A common characteristic of display systems is a mapping between items of data within the system and display features presented by the system. A structure "represents" a body of data when display features of the structure map one-to-one with the items of data in the body of data. A display feature "represents" the item of data to which it maps. For example, each node of a hierarchical node-link structure could represent a node in a tree of data or in another hierarchy of data items such as a directed graph that is organized into levels. The links of the structure can represent relationships between items of data, so that the links in a hierarchical node-link structure can represent hierarchical relationships such as parent-child relationships.

A second display feature is perceptible as a "continuation" of a first display feature when presentation of the second display feature follows presentation of the first display feature in such a way that the user perceives the first display feature as being continued when the second display feature is presented. This can occur when the successive display of two display features is so close in time and space that they appear to be the same display feature. An example of this is the phenomenon called "object constancy."

An "animation loop" is a repeated operation in which each repetition presents an image and in which objects and other display features in each image appear to be continuations of objects and display features in the next preceding image. If the user is providing signals through a user input means, the signals can be Queued as events and each loop can handle some events from the queue.

A second display feature is perceptible as a "moved continuation" of a first display feature if it is perceptible as a continuation in a different position. The first display feature is perceived as "moving" or as having "movement" or "motion" or as being "displaced." A "displacement" is a distance by which a feature is perceived as being displaced.

A moving object is perceived as following a "path." An "asymptotic path" is a path on which the perceived velocity decreases such that the path approaches but does not reach an asymptote.

When an object is perceived as following an asymptotic path, the displacements between successive positions follow an "asymptotic function." An example of an asymptotic function is a function in which a logarithm approaches zero asymptotically as time increases. The term "logarithmic function" includes such functions as well as functions that approximate them.

A "function of a distance" between two points or positions is a function that produces, for each of a set of distances, a set of respective values. For example, one simple logarithmic function of the distance between two points or positions can be obtained by taking a "proportion" of the distance, meaning a part of the distance that is greater than zero but less than the entire distance. A proportion of a distance can be obtained by multiplying the distance by a "proportionality constant," with the proportionality constant having a magnitude greater than zero and less than one.

Display features are perceptible as lying on a "plane-like surface" when they are perceptible as lying on a surface that approximates a plane. A "row-like arrangement" or "row" of display features, such as nodes in a node-link structure, is an arrangement in which the display features are perceptible as positioned in a series that extends like a row or column. A row-like arrangement may include display features that are not similarly shaped or that are unevenly spaced. A "selectable unit" is a display feature that is perceived as a bounded display area that can be selected. The term "select," when used in relation to a selectable unit, means a user input operation that includes a signal that uniquely indicates the selectable unit. The user can, for example, use a pointing device such as a mouse to select a selectable unit by indicating its position and clicking a button on the pointing device. In general, a selectable unit may take any appearance, and is not limited to a visually distinguishable feature or set of features that appears to be a coherent unity.

B. General Features

Figure 2:
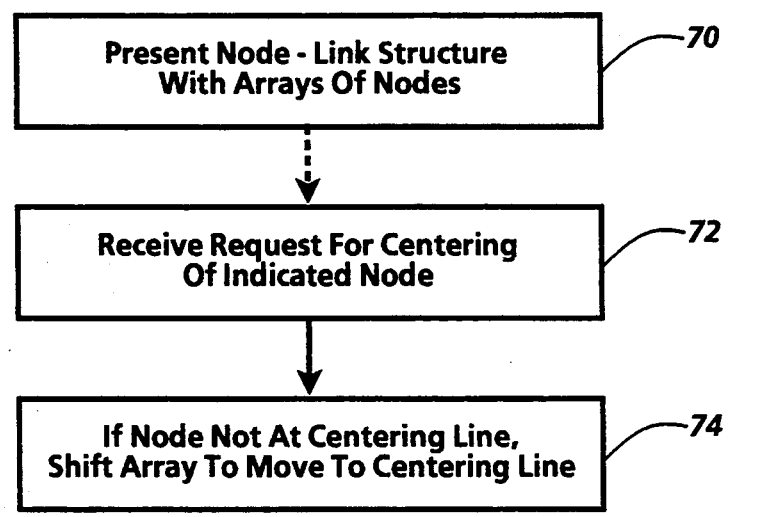
FIG. 2 is a flow chart showing general steps in shifting a row according to the invention.

FIGS. 1 and 2 illustrate general features of the invention. FIG. 1 shows a sequence of images in which a row that includes an indicated node is shifted so that the indicated node is at a centering line. FIG. 2 shows general steps for shifting a row as illustrated in FIG. 1.

FIG. 1 shows first image 10 and second image 12, each including a respective node-link structure that appears to lie in a plane. The node-link structure of image 10 includes two rows of nodes, one including parent node 20 and the other including child nodes 22, 24, and 26. Links 28 extend from parent node 20 to the child nodes. The rows of nodes extend across a centering line of the node-link structure, shown by arrows 30 and 32 at the boundary of image 10. Arrow 34 shows that the user has made a request for centering of node 22, which could be done with a mouse button click.

In response to the user request, second image 12 is presented. The node-link structure of image 12 includes parent node 40 and child nodes 42, 44, and 46. Links 48 extend from parent node 40 to the child nodes. The rows of nodes extend across a centering line of the node-link structure, shown by arrows 50 and 52 at the boundary of image 12. Nodes 40, 42, 44, and 46 appear respectively to be continuations of nodes 20, 22, 24, and 26 in image 10, but the row of child nodes appears to have been shifted to position node 42 at the centering line of the node-link structure.

In FIG. 2, the step in box 70 presents an initial image that includes a node-link structure with rows of nodes extending across a centering line. The step in box 72 receives a signal from a user requesting centering of an indicated node in one of the rows. In response, the step in box 74 determines whether the indicated node is on the centering line and, if not, presents a sequence of one or more images in which the row that includes the indicated node appears to be shifted, moving the indicated node toward or to the centering line.

C. Implementation

The general features described above could be implemented in numerous ways on various machines to provide interaction with node-link structures.

An implementation that has been made on a Silicon Graphics workstation is described below in relation to FIGS. 3–8.

1. General Steps

Figure 3:
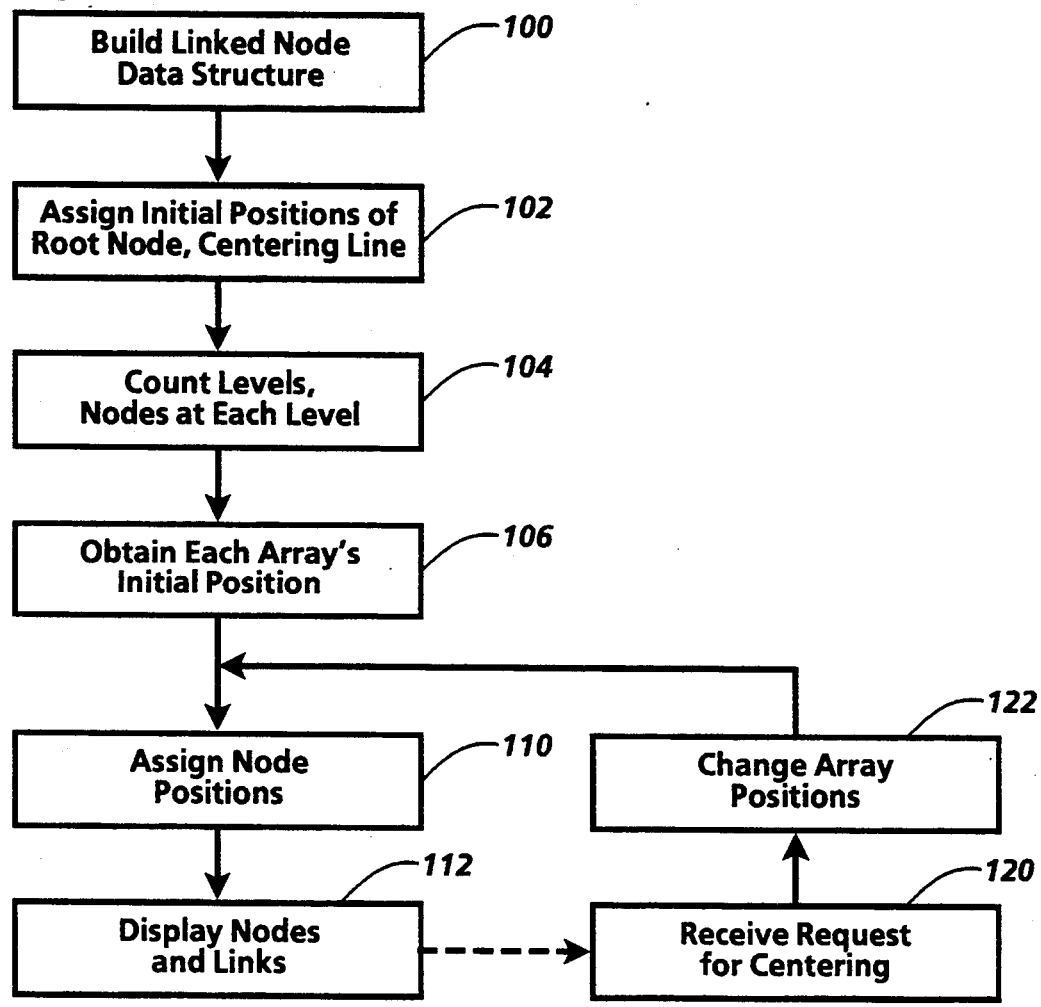
FIG. 3 is a flow chart showing general steps in presenting a structure like those in FIG. 1.
Figure 4:
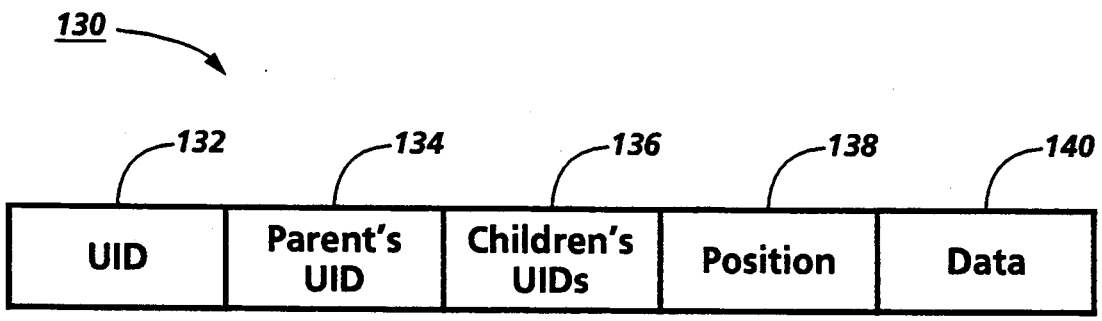
FIG. 4 is a schematic diagram of a data item for a node in a linked node data structure that can be used in providing a structure like those in FIG. 1.

FIG. 3 shows general steps of a current implementation. FIG. 4 shows an item in a data structure that is used to perform the steps in FIG. 3.

The step in box 100 in FIG. 3 produces a linked node data structure that can include data defining node-link structures as in FIG. 1. FIG. 4 shows node data item 130 From such a linked node data structure, and node data item 130 can be represented by one of the nodes in a node-link structure like those of FIG. 1. Item 130 includes UID field 132 for the unique identifier (UID) of the item, and parents' UID field 134 and children's UID field 136 include the UIDs of linked node data items. The step in box 100 produces a data structure in which these three fields define a tree, i.e. a rooted directed acyclic graph in which each node except the root has one and only one parent. The tree can be divided into hierarchical levels, with each node other than the root node being on a hierarchical level below the root node. Such a data structure could be produced by well known techniques from a wide variety of databases, including any directed graph, provided that the non-tree links are not so numerous that they interfere with presentation of the hierarchical structure. A similar data structure with more than one root node could be used to provide a multiply hierarchical structure.

The other fields of item 130 include position field 138, for data indicating the coordinates of a node and data field 140, for data such as a word to be presented in the node's selectable unit. Item 130 can include additional fields as appropriate. For example, an additional field could indicate the number of children a node has, to assist in scanning the linked node data structure.

After a linked node data structure has been produced in box 100, subsequent steps in FIG. 3 can operate on the data structure to present a node-link structure representing it and to handle user requests relating to the structure.

The step in box 102 prepares for presentation of a node-link structure by assigning initial positions to the root node and centering line. The step in box 104 similarly prepares for presentation by counting the number of hierarchical levels and the number of nodes in each level. The step in box 106 then uses the positions from box 102 and the counts from box 104 to obtain an initial position for each row of nodes. The step in box 110 uses the position of each row from box 106 to assign a position to each node in the row. Using the positions assigned in box 110, the step in box 112 displays the nodes and links, presenting an initial node-link structure.

When the step in box 120 receives a signal from the user indicating a node and requesting a centering operation, the step in box 122 responds by changing the positions of the rows appropriately, after which the steps in boxes 110 and 112 are again performed to present another node-link structure with the rows shifted. To provide animated motion, the steps in boxes 122, 110, and 112 can be repeated several times, with the positions from box 122 bringing the indicated node to the centering line in a sequence of steps.

The initial root node position from box 102 can be stored in position field 138 of the root node's data item 130 in FIG. 4. In the current implementation, this position is defined in three dimensions and each node-link structure appears to lie in an x-y plane referred to as the "display plane." Alternatively, the position could be defined in two dimensions relative to the display surface. In either case, the initial root node position should be toward an edge of the display plane to allow presentation of a node-link structure. The initial root node position can also be centered within the display, and can lie on the centering line. In the current implementation, the initial centering line extends horizontally at the y-midpoint of the display plane, and the initial root node position is on the centering line near the left edge of the display plane.

The step in box 104 scans through the linked node data structure to count hierarchical levels and nodes at each level. Variables indicating current UID, current level, and deepest level can be used to obtain the count of levels, and a node count array with an element for each level can be used to count the nodes at each level. The current UID, which indicates the current position of the scan, can start with the UID of the root node and the current level and deepest level can both start at zero, the level of the root node.

Whenever the current UID's data item 130 has children that have not been visited, the current UID is changed to the next child's UID, the current level is increased by one, and then the current level's element in the node count array is incremented. If the current level is greater than the deepest level, the deepest level is set to the current level. When the current UID's data item 130 has no children or all its children have been visited, the current UID is changed to its parent's UID and the current level is decreased by one. If the current UID does not have a parent UID, the root node has been reached at completion of the scan.

The step in box 106 can obtain the x-position of each level's row of nodes using the x-width of the display plane, the number of levels, the width of nodes, and the initial root node x-position. The rows can be evenly distributed between the x-position of the root node and the right edge of the display plane, for example. The step in box 106 can obtain the initial y-position of each level using the number of nodes in the level, the height h of each node, the offset f between adjacent nodes, and the y-position of the centering line. For example, the y-position of each row at any given time could be defined as the y-position of the center of the top node in the row, in which case the row's initial y-position could be calculated as $$y_{row} = y_{center} + (n_{nodes} - 1)(h+f)/2$$

so that the row would be initially centered vertically. The x- and y-positions of the rows could be stored in x- and y-position arrays.

The y-position of a row may be outside the boundaries of the display plane. In this case, part of the row is not actually presented.

As noted above, the steps in boxes 122, 110, and 112 can be animated to provide a perception of smooth row motion.

2. Animated Steps

Figure 5:
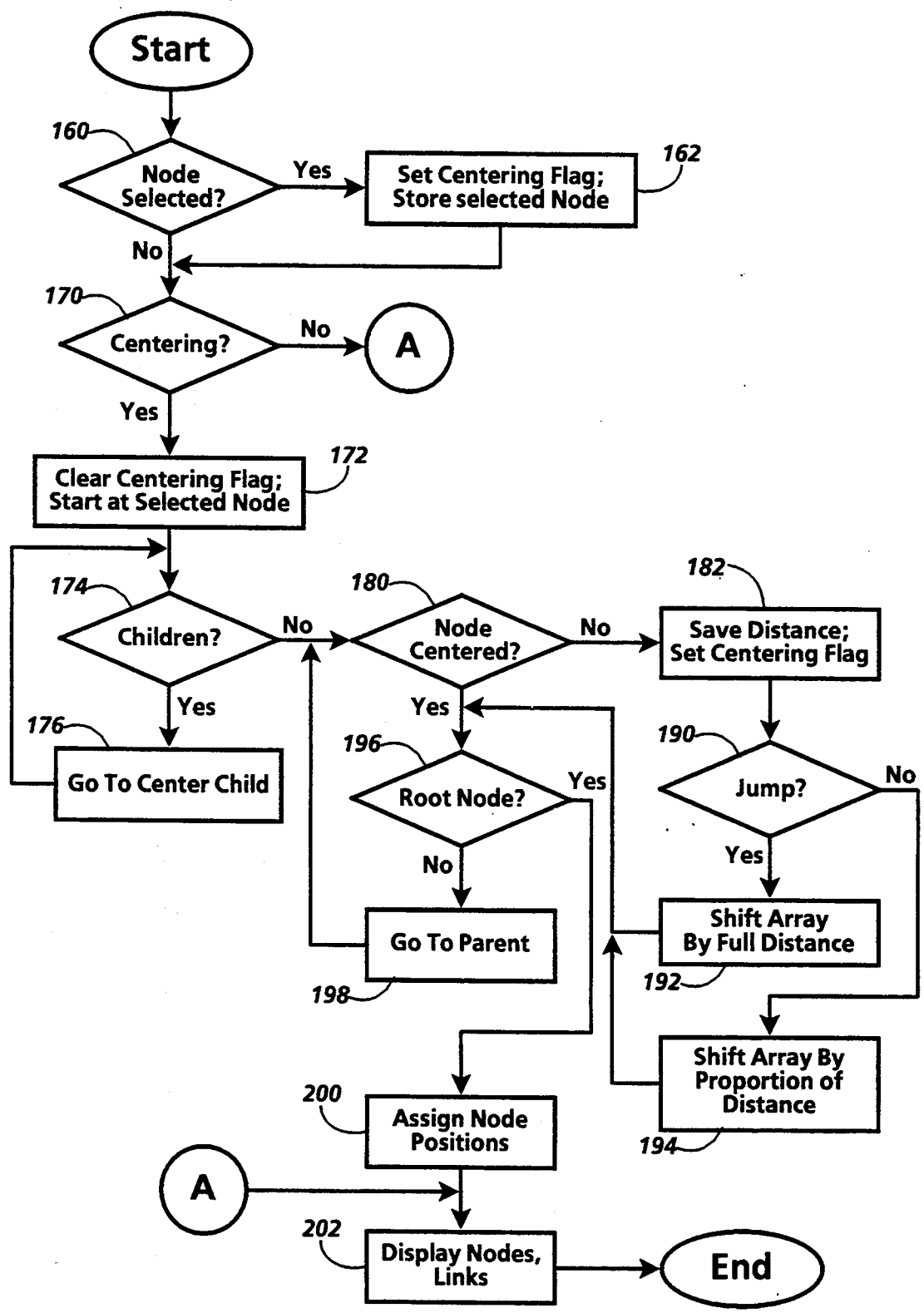
FIG. 5 is a flow chart showing steps in an animation loop that shifts a row along an asymptotic path using a logarithmic function.
Figure 6:
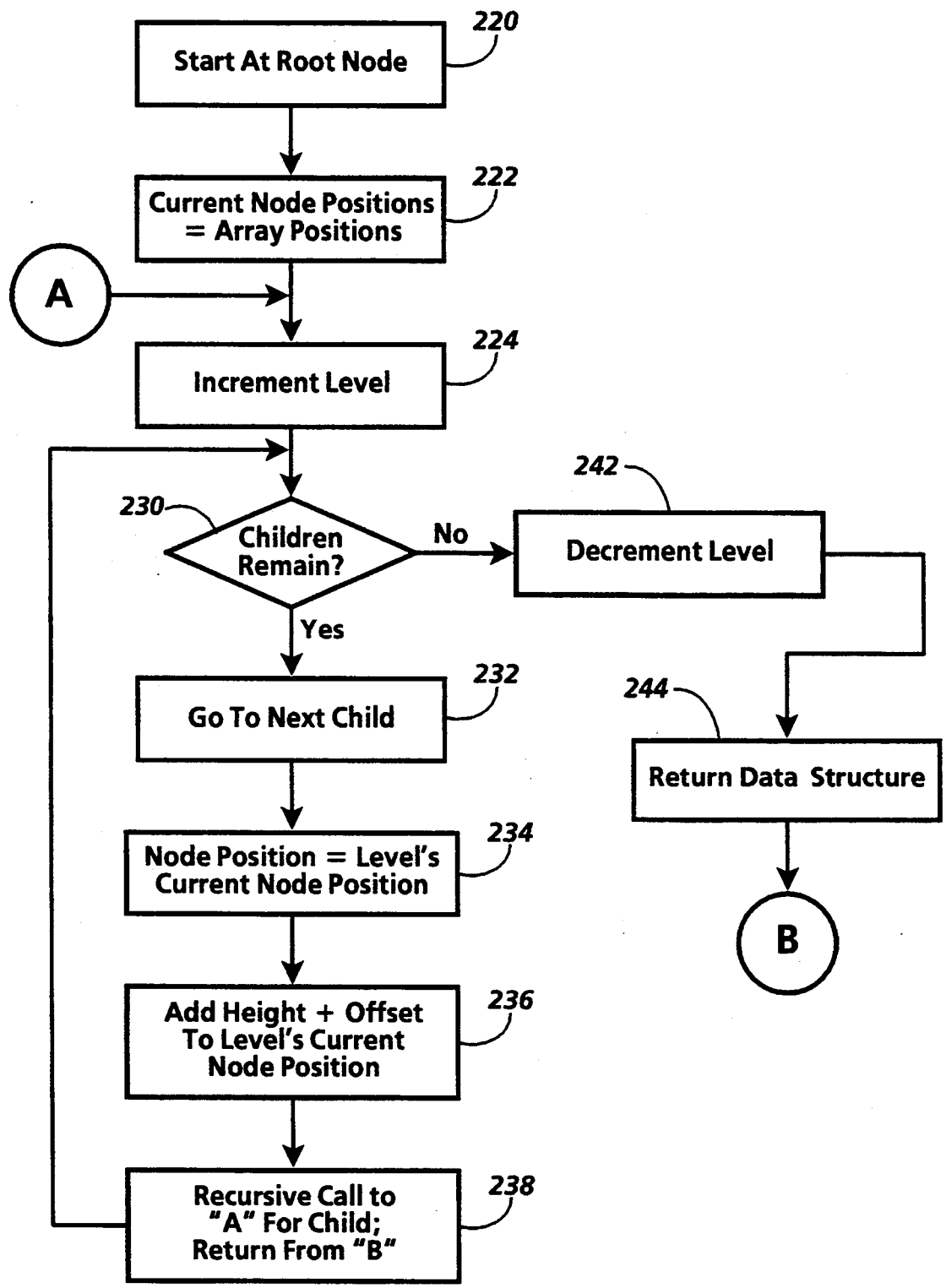
FIG. 6 is a flow chart showing steps in assigning node positions in FIG. 5.

FIGS. 5 and 6 show how the steps in boxes 122, 110, and 112 can be performed by an animation loop. FIG. 5 shows how centering is handled by an animation loop. FIG. 6 shows how positions are assigned to nodes during each animation cycle.

The relevant part of the animation loop, as shown in FIG. 5, branches in box 160 based on whether a signal has been received from the user input device requesting centering and indicating a node. If a request for centering has been received, as in box 120 in FIG. 3, the step in box 162 responds by setting a centering flag and saving the UID of the node indicated by the user in a selected node variable. Before the animation loop begins to run, the centering flag is cleared.

The step in box 170 then branches based on the centering flag. If the centering flag is set, the step in box 172 clears it and sets the selected node as the current node. Then the step in box 174 branches based on whether the current node has any children. If so, the step in box 176 determines which child is the center child and sets the center child as the current node. In other words, the loop that includes steps 174 and 176 goes downward in the tree to a childless center descendant of the selected node. Where a current node has an even number of children, a procedure can be followed that picks a center child from the two children closest to the center.

When the childless center descendant is reached, the step in box 180 begins an iterative loop that goes upward in the tree, setting up each row it crosses for centering, until it reaches the root node. The step in box 180 determines whether the current node is already on the centering line, by comparing position field 138 of its data item 130 with the y-position of the centering line. If the difference between the two exceeds a small fixed value, the node is not centered, so the step in box 182 saves the distance from the node's position to the centering line and sets the centering flag to indicate that the next animation cycle should again perform centering.

The step in box 190 determines whether the node should be centered by shifting its row in a single jump or by shifting its row in steps. The jump provides a perception that the row has locked or snapped into position. For example, if the distance from the node to the centering line is currently less than the sum of node height h and the offset f between nodes, a jump can appropriately be made.

To make a jump, the step in box 192 changes the y-position of the current node's row by the full distance from the node to the centering line. To make a step, the step in box 194 instead changes the y-position of the row by a proportion of the distance from the node to the centering line. The proportion can be the quotient of the time per animation cycle divided by the desired length of time to complete centering. A completion time of about one second is appropriate because one second is approximately the unrehearsed response time for the human cognitive system. If each animation cycle takes 100 msec, for example, the proportionality constant used in box 194 can be 0.10 or 10%. In practice, a proportionality constant less than or equal to 0.60 provides a perception of smooth motion, while the motion may be too fast with a proportionality constant greater than 0.60.

Shifting a row by a constant proportion of the remaining distance to the centering line in box 194 provides asymptotic motion according to a logarithmic function. In other words, the row moves rapidly when it begins moving and slows as it approaches a position with the current node centered. The combination of asymptotic motion with jumping, described above, assists the user's perceptual system in tracking relationships between display objects, and provides the perception that nodes and links presented in a later animation cycle are continuations of nodes and links in a previous animation cycle, an example of the phenomenon of object constancy. The logarithmic function ensures that rearrangement occurs quickly, yet slower during the final stages, when object relationship tracking is more critical.

When any change in the current node's row has been completed, the step in box 196 determines whether the root node has been reached. If not, another iteration is appropriate, so the step in box 198 goes to the current node's parent, and the parent becomes the new current node. When the root node is reached, the step in box 200 assigns node positions and the step in box 202 completes the animation cycle by displaying the nodes and links. If centering is not being performed, the step in box 202 can be performed immediately after the branch in box 170, as shown.

FIG. 6 shows steps followed in assigning node positions in box 200 in FIG. 5. The step in box 220 begins at the root node's item in the linked node data structure and the remaining steps perform a scan of the data structure, completing position field 138 in each node's item. The variables current level and current node are used to save the current position of the scan.

The step in box 222 prepares to assign positions by setting up a current node position array, with the position for the current node in each row set to the row's y-position, either from box 106 in FIG. 3 or as shifted in box 192 or box 194 in FIG. 5. The current node position array has one element for each row of nodes. The step in box 224 then increments the current level in preparation to handle the current node's child nodes.

The step in box 230 begins an iterative loop that handles each of the child nodes of the current node, accessing each child node using its UID from field 136. The step in box 232 makes the next child the current node. The step in box 234 assigns the current level's current node position to the current node's position field 138. The step in box 236 adds the node height h and the offset between nodes to the current level's current node position. The step in box 238 then makes a recursive call for the child node that is the current node, so that position field 138 is similarly completed for each of its children nodes and their descendants. This recursive call enters the steps in FIG. 6 before box 224 and exits after the test in box 230 indicates that there are no children or that all children have been handled, as shown by the circled letters A and B. Upon returning from the recursive call, the step in box 230 continues the loop through the child nodes.

When all children of the current node have been handled by the iterative loop, the step in box 242 decrements the current level to return to the level of the parent. When all children of the root node have been handled, the step in box 244 returns the data structure so that the nodes and links can be displayed in box 202 in FIG. 5. Each node is presented at the position indicated by its position field 138, and the links are presented by connecting each node to its parent node.

The steps in boxes 200 and 202 in FIG. 5 do not depend on whether centering is being performed, and can be performed in the same way whether or not the centering flag is set.

3. Example Images

FIGS. 7A–7D show a sequence of images produced by steps like those in FIGS. 5 and 6. Because the images in FIGS. 7A–7D include more nodes than the images in FIG. 1, they illustrate some features of the invention more fully.

Figure 7A:
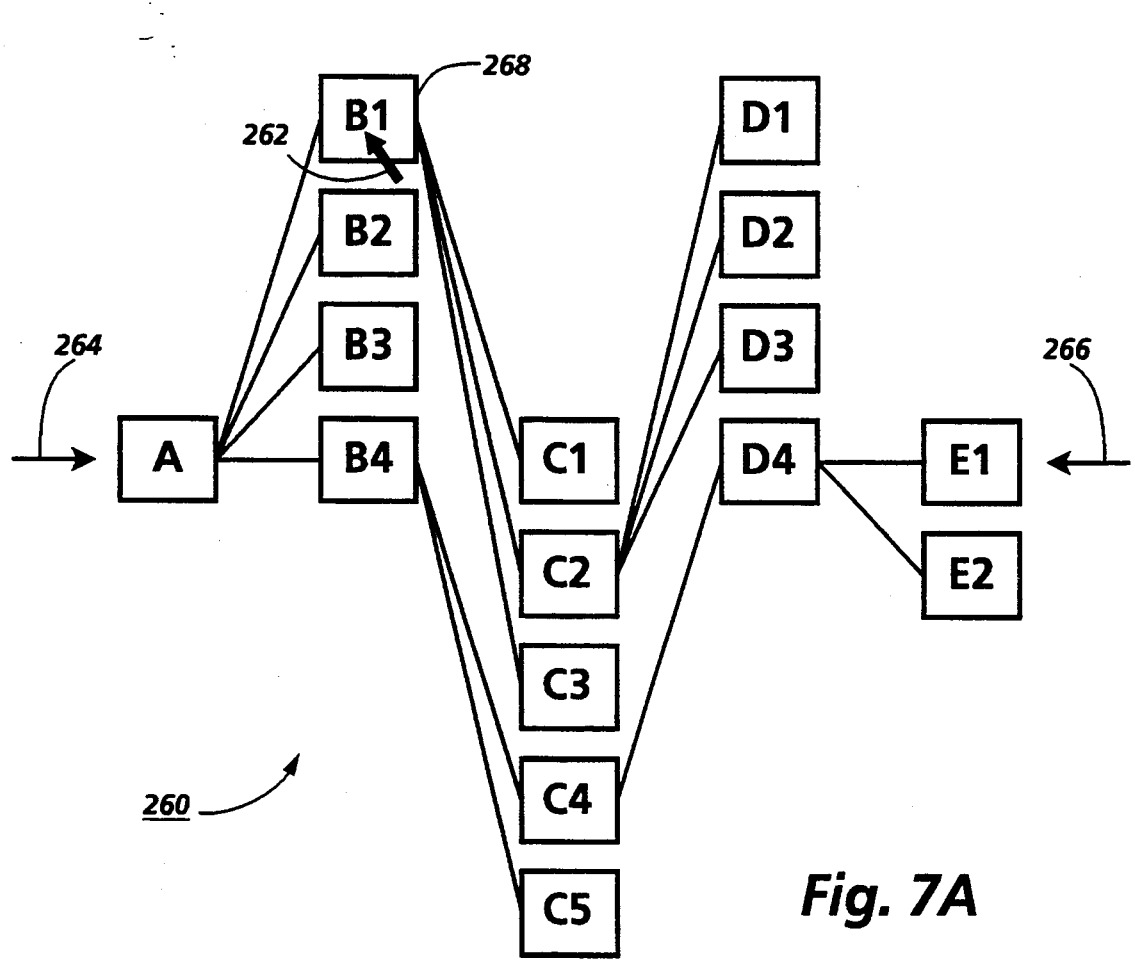
FIGS. 7A–7D are a series of four images illustrating centering according to the steps in FIGS. 5 and 6.

Node-link structure 260 in FIG. 7A has five rows of nodes. Each node is a selectable unit such that, when a user uses a pointer control device such as a mouse to select it, the system responds by centering the selected node.

Arrow 262 is a pointer that can be used to select a node by pushing a mouse button or the like when arrow 262 is positioned on the node. The centering operation moves the selected node to the center line indicated by arrows 264 and 266. As shown, node 268, labelled "B1" is now selected, beginning a centering operation.

Before presenting the next image, the system traces downward to the center descendants of the selected node. In this case, node 268 has a center child node labelled "C2" and it in turn has a center child node labelled "D2."

Then, starting at the lowest center descendant, the system traces upward to the root node, labelled "A," to determine how far to shift each row. The steps in FIGS. 7B–7D use a proportionality constant of 0.5 for each step, which leads to rather large shifts. For example, treating the sum of node height and offset between nodes as a unit, node "D2" is two units away from the centering line, so that its row shifts by one unit, leaving it one unit from the centering line. Similarly, node "C2," the center descendant in the middle level, is one unit away from the centering line, so that its row shifts by one-half unit, leaving it one-half unit from the centering line. Node "B1," the selected node, is three units away from the centering line, so that its row shifts by 1.5 units, leaving it 1.5 units away.

Figure 7B:
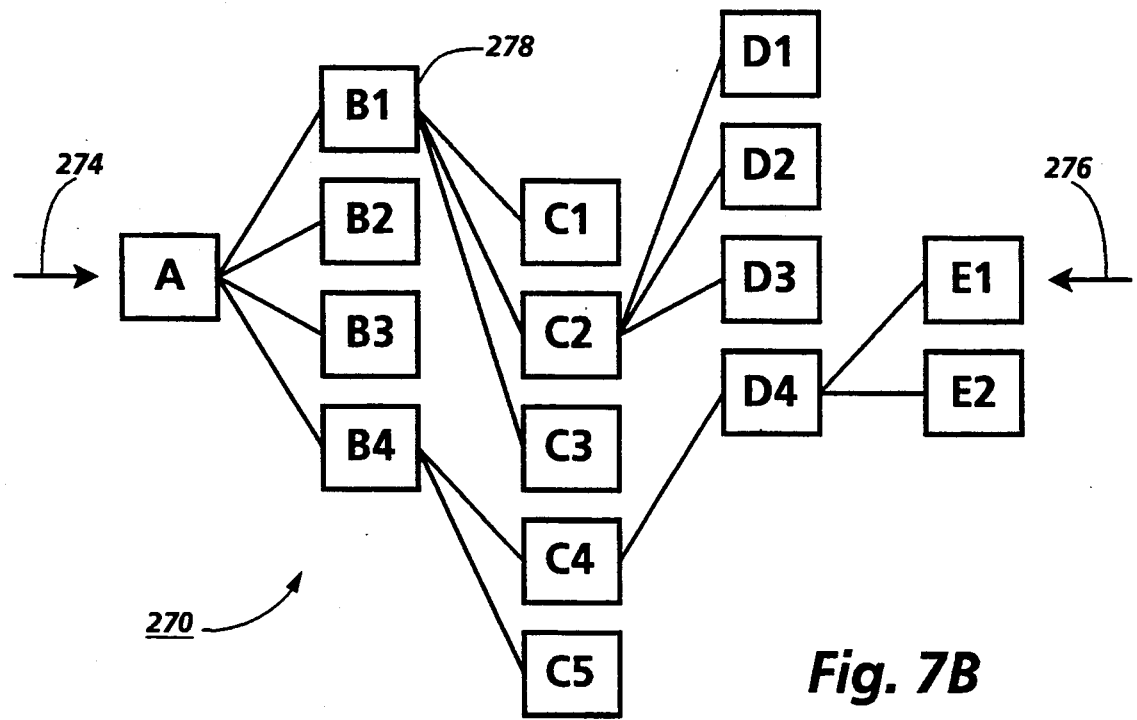

The root node is already centered, so its row is not shifted. Also, none of the nodes in the lowest layer are in the path from the lowest center descendant to the root node, so the lowest row is not shifted. FIG. 7B illustrates the result of the shifts described above, completing the first animation cycle after selection of node 268 in FIG. 7A. Node-link structure 270 appears to be a continuation of node-link structure 260, but with the B, C, and D rows shifted toward the centering line defined by arrows 274 and 276.

Since the user has not selected another node, node 278, labelled "B1," remains the selected node. Another animation cycle begins, again going downward to node "D2" and then upward to the root node.

Figure 7C:
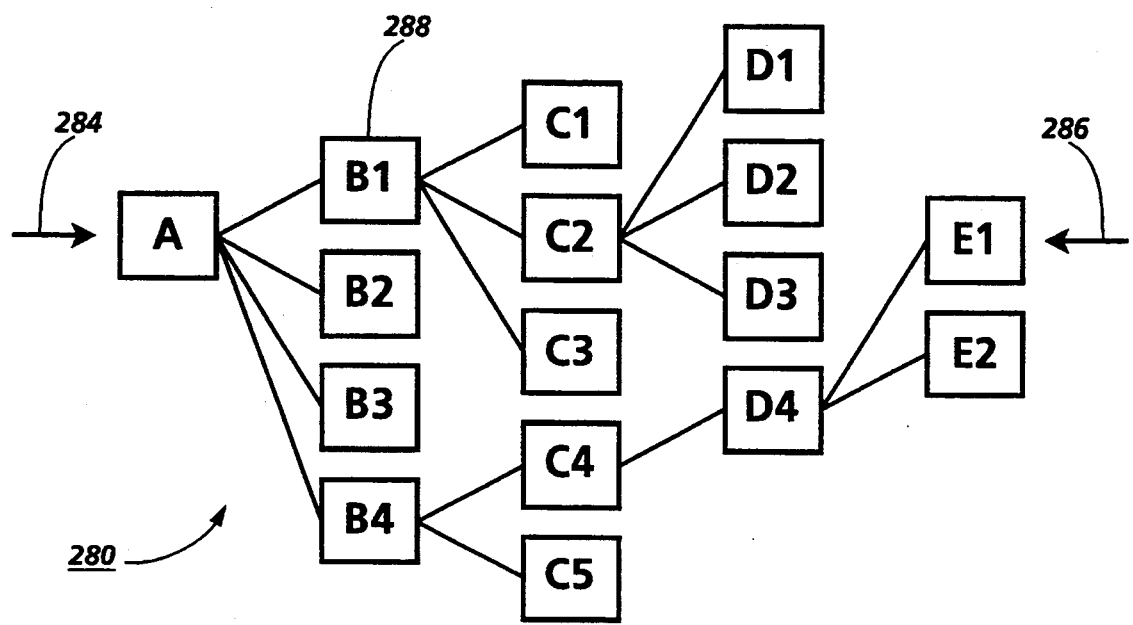
Figure 7D:
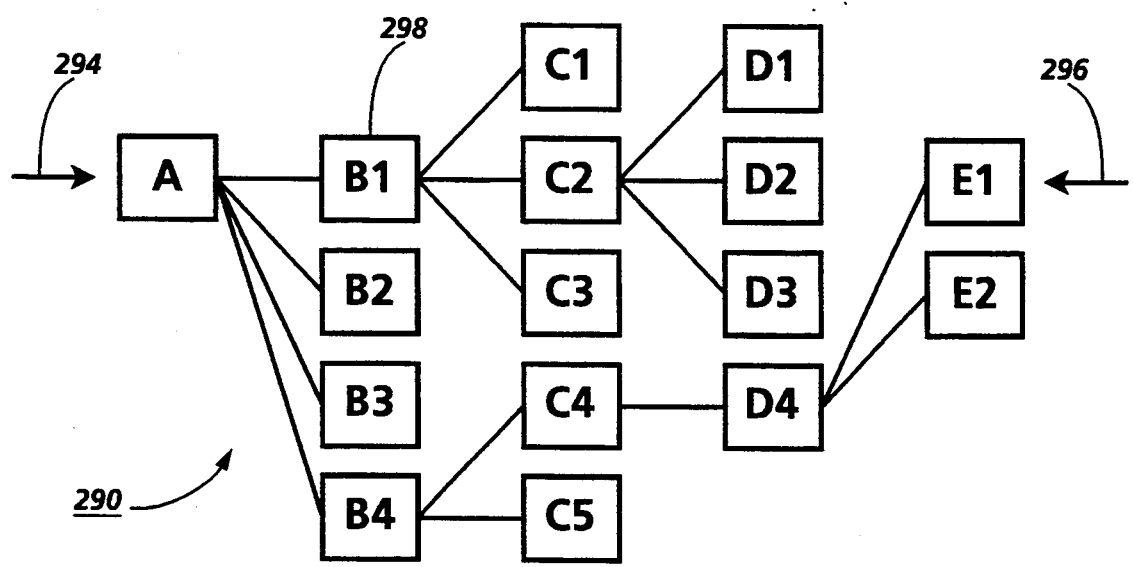

The animation cycle following FIG. 7B illustrates how asymptotic motion according to a logarithmic function can be followed by a last shift step that brings a node to the centering line. For example, a node can jump to the centering line when its asymptotic motion brings it within a fixed distance of the centering line. In FIGS. 7B-7D, this fixed distance is the sum of node height and offset referred to above as a unit. When a node being centered is less than one unit from the centering line, the node jumps to the centering line rather than making another asymptotic step.

In FIG. 7B, node "C2" is less than one unit from the centering line, so that its array is shifted by one-half unit, the full remaining distance to the centering line. Node "D2" is one unit from the centering line, so that its row is also shifted by one-half unit, leaving it one-half unit from the centering line. Node "B1" is 1.5 units from the centering line, so that its row is shifted by 0.75 units, leaving it 0.75 units from the centering line.

FIG. 7C illustrates the result of these shifts, completing the second animation cycle after selection of node 268 in FIG. 7A. Node-link structure 280 appears to be a continuation of node-link structures 260 and 270, but with the B, C, and D rows again shifted toward the centering line indicated by arrows 284 and 286.

Once again, the user has not selected another node, node 288, labelled "B1," remains the selected node. Another animation cycle begins, again going downward to node "D2" and then upward to the root node. In FIG. 7C, node "D2" is one-half unit from the centering line, so that its row is shifted by one-half unit, the full remaining distance to the centering line. Similarly, node "B1" is 0.75 units from the centering line, so that its row is shifted by 0.75 units, the full remaining distance to the centering line. The other nodes on the path from the lowest center descendant to the root node are already at the centering line.

FIG. 7D illustrates the centered structure. Node-link structure 290 appears to be a continuation of node-link structures 260, 270, and 280, but with a path from the selected node's lowest center descendant to the root node at the centering line defined by arrows 294 and 296. Node 298 is shifted so that it, its center descendants, and its ancestors, are all on the centering line, providing global context detail as discussed above.

FIGS. 7A-7D illustrate how a centering operation affects descendants and ancestors of a selected node. They also illustrate asymptotic motion according to a logarithmic function, a last shift that jumps to the centering line, and the shifting of different rows in opposite directions.

4. System Features

Figure 8:
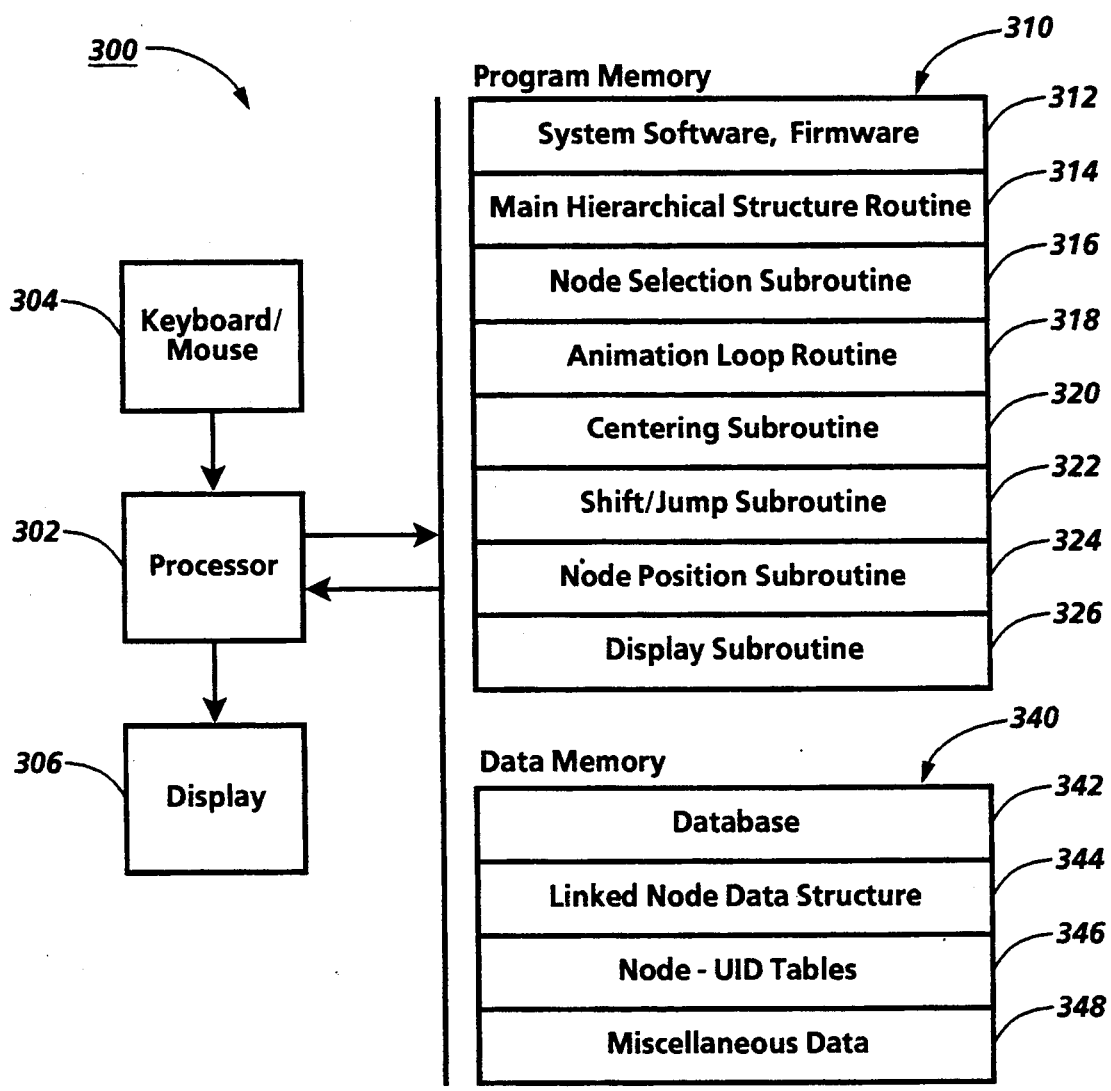
FIG. 8 is a schematic block diagram showing components of a system implementing the invention.

FIG. 8 shows components of system 300 implementing the features described above. System 300 includes processor 302, which could be any processor and could include one or more CPUs and may include specialized hardware such as one or more coprocessors to provide specific functions. In the current implementation, processor 302 is the CPU of a Silicon Graphics workstation with graphics facilities as described in *SGI Graphics Library Programming Guide*, Silicon Graphics Inc., Mountain View, Calif., incorporated herein by reference.

Processor 302 is connected for receiving signals based on user input actions from a user input device that includes keyboard and mouse 304, and is also connected for providing image data to an image output device that includes display 306. Processor 302 is also connected for accessing program memory 310 and data memory 340.

Program memory 310 includes instructions executed by processor 302 during its operation, including the following: Underlying system software and firmware 312 provide the operating system and other facilities of system 300. Main hierarchical structure routine 314 is called and performed when the user requests presentation of a hierarchical structure, and can include steps like those in FIG. 3. Node selection subroutine 316, called when the user selects a node, sets the centering flag and saves the selected node $\propto$s UID.

Animation loop routine 318, periodically executed, calls other subroutines as appropriate. Centering subroutine 320 is called if the centering flag is set, and it in turn calls shift/jump subroutine 322 to obtain the appropriate shift for each row, as illustrated in FIG. 5. Node position subroutine 324, which can include steps like those in FIG. 6, and display subroutine 326 are called by animation loop routine 316 to obtain presentation of a node-link structure. Display subroutine 326 can include a scan of the linked node data structure like that in FIG. 6 to obtain a display of the nodes and each node's link to its parent.

Data memory 340 includes data accessed by processor 302 during execution of instructions in program memory 310, including the following: Database 342 is an underlying data structure accessed by main routine 314. Linked node data structure 344 is produced by main routine 314 based on database 342 and is used by most of the other routines shown. Database 342 can thus have any form that admits of the production of a linked node data structure relating to its contents. Node-UID tables 346 are set up by main hierarchical structure routine 314 to map between selectable units and the UIDs of their respective nodes. Miscellaneous data 348 includes initial values and other data that is used in executing instructions in program memory 310.

Miscellaneous data 348 can include a number of variables, including global variables indicating the boundaries of the display surface, the height of a node's selectable unit, and the offset between nodes; and local variables indicating the centering line position, the count of levels, the current level, the current node's UID, the selected node's UID, and the centering flag; and data arrays for holding data for each level of the structure, including node counts, row x-positions, row y-positions, and current node's position.

D. Miscellaneous

The following U.S. patent applications are incorporated herein by reference: application Ser. No. 07/459,010, continued as application Ser. No. 07/795,238, continued as application Ser. No. 08/066,311, now issued as U.S. Pat. No. 5,295,243, entitled "Display of Hierarchical Three-Dimensional Structures with Rotating Substructures" ("the rotating substructures application"); application Ser. No. 07/562,048, entitled "Moving an Object in a Three-Dimensional Workspace"; and application Ser. No. 07/561,627, issued as U.S. Pat. No. 5,276,785 entitled "Moving Viewpoint with Respect to a Target in a Three-Dimensional Workspace." The rotating substructures application discloses three-dimensional node-link structures, and the invention has been implemented in a way that allows animated transitions between such structures and the structures described above.

The invention has been described in relation to implementations in which nodes in a row are evenly spaced, regardless of their links. The invention might also be implemented with siblings grouped more closely than non-siblings. Also, siblings could be centered in relation to their parent. In general, the techniques of the invention can be used with any conventional tree layout algorithm, and the nodes can have any appropriate shape.

The invention has been described in relation to implementations in which a single mouse click on a node's selectable unit is sufficient to request centering. The invention might also be implemented with an additional command such that the node must be indicated somehow and the command must also be provided to request centering. Nodes could be indicated by identifiers rather than by a pointer.

The invention has been described in relation to implementations in which rows of nodes extend vertically across a horizontal centering line. The invention could alternatively be implemented with rows of nodes extending horizontally across a vertical centering line. The invention might also be implemented with a centering line at a different orientation or with a centering line that is not a straight line but includes angles or curves. Also, multiple centering lines could be provided, such as in the case of a structure with more than one root node. To further emphasize the importance of the nodes along the centering line, the nodes and links from the lowest center descendant up through the root node could be highlighted or otherwise presented in a more visible manner.

The invention has been described in relation to implementations in which node-link structures appear to lie in a plane. The invention might also be implemented with structures appearing to lie in other plane-like surfaces, including slightly curved surfaces. It is advantageous, however, if orthogonal positions, such as x- and y-positions, can be handled independently, so that a row can be shifted by changing a single coordinate.

The invention has been described in relation to software implementations, but the invention might be implemented with specialized hardware.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method of operating a processor connected for providing image data to an image output device that includes a display, the image output device presenting images on the display in response to the image data; the processor further being connected for receiving signals from a user input device; the method comprising steps of:

providing first image data so that the image output device presents a first image, the first image including a first node-link structure that is perceptible as lying on a plane-like surface; the first node-link structure including a first set of three or more nodes arranged in two or more rows with at least two nodes in one row and at least one node in a different row; the first node-link structure having a centering line across which row extends; the first node-link structure further including a first set of two or more links, each of the first set of links being perceptible as connecting two of the first set of nodes, the two connected nodes being in different rows;

receiving a signal from the user input device indicating one of the first set of nodes in the first node-link structure;

in response to the signal from the user, determining whether the indicated node is at the centering line of the first node-link structure; and if the indicated node is not at the centering line of the first node-link structure, providing second image data so that the image output device presents a second image, the second image including a second node-link structure that is perceptible as lying on a plane-like surface; the second node-link structure including a second set of three or more nodes arranged in two or more rows with at least two modes in one row and at least one node in a different row; the second node-link structure having a centering line across which row extends; the second node-link structure further including a second set of two or more links, each of the second set of links being perceptible as connecting two of the second set of nodes, the two connected nodes being in different rows;

each of the second set of nodes being perceptible as a continuation of a respective one of the first set of nodes; the second set of nodes including a continued indicated node that is perceptible as a continuation of the indicated node; the continued indicated node being at the centering line of the second node-link structure;

the rows of the second node-link structure being perceptible as continuations of the rows of the first node-link structure, with the indicated node's row shifted to position the continued indicated node at the centering line of the second node-link structure.

2. The method of claim 1 in which the second node-link structure is perceptible as a continuation of the first node-link structure.

3. The method of claim 1 in which the processor is further connected for accessing a body of data that includes a hierarchy of data items, the hierarchy including two or more levels, each data item being at a respective one of the levels; the first and second node-link structures each representing the body of data, each node representing a respective one of the data items, each row including nodes representing data items at a respective level of the hierarchy of data items, the links representing hierarchical relationships between data items; the rows being positioned along the centering line according to the respective levels of the hierarchy of data items.

4. The method of claim 3 in which the levels of the hierarchy of data items include a top level and two or more lower levels, each lower level having a next higher level; each node in a row representing a lower level having a link to a respective parent node in a row representing the lower level's next higher level.

5. The method of claim 4 in which the determining step comprises a substep of determining whether the indicated node has a respective parent node and, if so, whether the indicated node's parent node is at the centering line of the first node-link structure;

if the indicated node has a respective parent node, the second set of nodes including a continued parent node that is perceptible as a continuation of the parent node; the continued parent node being at the centering line of the second node-link structure, so that if the indicated node's parent node is not at the centering line of the first node-link structure, the parent node's row is perceptible as shifted to position the continued parent node at the centering line of the second node-link structure.

6. The method of claim 4 in which the determining step comprises a substep of determining whether the first node-link structure includes child nodes whose respective parent node is the indicated node;

if the first node-link structure includes child nodes whose respective parent node is the indicated node, the second set of nodes including continued child nodes that are perceptible as continuations of the child nodes; the continued child nodes being at the centering line of the second node-link structure, so that if the child nodes are not at the centering line of the first node-link structure, the row that includes the child nodes is perceptible as shifted to position the continued child nodes at the centering line of the second node-link structure.

7. The method of claim 1 in which the indicated node is a selectable unit, the signal from the user input device being a signal selecting the indicated node.

8. The method of claim 7 in which the user input device includes a mouse with a button, the user clicking the mouse button to provide the signal.

9. The method of claim 1 in which each node is perceptible as a rectangle, each row extending in a respective first direction across the centering line, each node in each row having a respective first side extending in a respective second direction perpendicular to the row's first direction so that the nodes in each row have parallel first sides.

10. The method of claim 9 in which each node has a third side parallel to the first side, the nodes in each row being in a sequence such that the third side of a preceding node in the sequence is next to the first side of a following node in the sequence, each third side being separated from the first side next to it by an equal offset;

11. A method of operating a processor connected for providing image data to an image output device that includes display, the image output device presenting images on the display in response to the image data; the processor further being connected for receiving signals from a user input device; the method comprising:

a step of providing initial image data so that the image output device presents an initial image, the initial image including an initial node-link structure that is perceptible as lying on a plane-like surface; the initial node-link structure including an initial set of three or more nodes arranged in two or more rows with at least two nodes in one row and at least one node in a different row; the initial node-link structure having a centering line across which each row extends; the initial structure further including an initial set of two or more links, each of the initial set of links being perceptible as connecting two of the initial set of nodes, the two connected nodes being in different rows;

a step of receiving a signal from the user input device indicating one of the initial set of nodes in the initial node-link structure; in response to the signal from the user, a step of determining whether the indicated node is at the centering line of the initial node-link structure; and if the indicated node is not at the centering line of the initial node-link structure, a sequence of image output steps, each image output step providing respective-image data so that the image output device presents a respective image including a respective node-link structure that is perceptible as lying on a plane-like surface; each image output step's node-link structure including a respective set of three or more nodes arranged in two or more rows with at least two nodes in one row and at least one node in a different row; the node-link structure having a centering line across which each row extends; each image output step's node-link structure further including a respective set of two or more links, each perceptible as connecting two of the respective set of nodes, the two connected nodes being in different rows;

each node in each image output step's set of nodes being perceptible as a continuation of a respective one of the initial set of nodes; the step's set of nodes including a respective continued indicated node that is perceptible as a continuation of the indicated node; the step's continued indicated node being shifted toward the centering line of the step's node-link structure; the rows of the step's node-link structure being perceptible as continuations of the rows of the initial node-link structure, with the indicated node's row shifted to move the step's continued indicated node toward centering line of the second node-link structure.

12. The method of claim 11 in which the sequence of image output steps is performed in approximately one second.

13. The method of claim 11 in which the indicated node in the initial image is perceptible as having a respective position and the continued indicated node in the respective image of each image output step is perceptible as having a respective position, the respective positions of the indicated node in the initial image and the continued indicated nodes in the respective images of a subset of the image output steps together defining an asymptotic path.

14. The method of claim 13 in which the asymptotic path begins at the indicated node's position in the initial image and is asymptotic with respect to the centering line.

15. The method of claim 13 in which the respective position of each of the continued indicated nodes in the respective images of the subset of the image output steps is displaced by a respective displacement from the respective position of a next preceding step; the respective displacements of the continued indicated nodes in the respective images of the subset of the image output steps following a logarithmic function.

16. The method of claim 15 in which the respective position of each of the continued indicated nodes in the respective images of the subset of the image output steps is at a respective distance from the centering line; the respective displacement of each continued indicated node in the respective images of the subset of the image output steps being a proportion of the respective distance of the next preceding step.

17. The method of claim 13 in which the sequence of image output steps includes a last shift step, the last shift step following the subset of the image output steps; the last shift step's continued indicated node being at the centering line so that a next preceding step's continued indicated node is perceptible as locking into position at the centering line.

18. The method of claim 11 in which each of the sequence of image output steps comprises a substep of performing an animation loop.

19. A method of operating a processor connected for providing image data to an image output device that includes a display, the image output device presenting images on the display in response to the image data; the processor further being connected for receiving signals from a user input device; the method comprising steps of:

provㅇding first image data so that the image output device presents a first image, the first image including a first node-link structure that is perceptible as lying on a plane-like surface; the first node-link structure including a first set of three or more nodes arranged in two or more rows with at least two nodes in one row and at least one node in a different row; the first node-link structure having a centering line across which each row extends; the first node-link structure further including a first set of two or more links, each of the first set of links being perceptible as connecting two of the first set of nodes, the two connected nodes being in different rows;

receiving a signal from the user input device indicating an indicated set of nodes in the first node-link structure; each of the rows in the first node-link structure including no more than one of the indicated set of nodes;

in response to the signal from the user, determining whether each of the nodes in the indicated set of nodes is at the centering line of the first node-link structure; and if at least one of the nodes in the indicated set of nodes is not at the centering line of the first node-link structure, providing second image data so that the image output device presents a second image, the second image including a second node-link structure that is perceptible as lying on a plane-like surface; the second node-link structure including a second set of three or more nodes arranged in two or more rows, each node being in a respective one of the rows withat least two nodes in one row and at least one node in a a different row; the second node-link structure having a centering line across which each row extends; the second node-link structure further including a second set of two or more links, each of the second set of links being perceptible as connecting two of the second set of nodes, the two connected nodes being in respective rows that are next to each other in the sequence;

each of the second set of nodes being perceptible as a continuation of a respective one of the first set of nodes; the second set of nodes including, for each of the indicated set of nodes in the first node-link structure that is not at the centering line, a respective continued node that is perceptible as a continuation of the node; the continued node being at the centering line of the second node-link structure;

the rows of the second node-link structure being perceptible as continuations of the rows of the first node-link structure, with each row that includes a continued node of one of the indicated set of nodes that is not at the centering line in the first node-link structure shifted to position the continued node at the centering line of the second node-link structure.

20. The method of claim 19 in which the processor is further connected for accessing a body of data that includes a hierarchy of data items, the hierarchy including two or more levels, each data item being at a respective one of the levels; the first and second node-link structures each representing the body of data, each node representing a respective one of the data items, each row including nodes representing data items at a respective level of the hierarchy of data items, the links representing hierarchical relationships between data items; the rows being positioned along the centering line according to the respective levels of the hierarchy of data items.

21. The method of claim 20 in which the levels of the hierarchy of data items include a top level and two or more lower levels, each lower level having a next higher level; each node in a row representing a lower level having a link to a respective parent node in a row representing the lower level's next higher level.

22. The method of claim 21 in which the indicated set of nodes includes a root node representing a data item at the top level of the hierarchy and a number of lower level nodes, each lower level node's parent node being in the indicated set so that the indicated set includes a lowest node and all ancestors of the lowest node.

23. The method of claim 22 in which the step of determining whether each of the nodes in the indicated set of nodes is at the centering line comprises:

a substep of accessing the lowest node's data item to determine whether the lowest node is at the centering line; and a sequence of substeps, each substep accessing the data item represented by the respective parent node of the node whose data item was accessed in the previous substep to determine whether the parent node is at the centering line;

the sequence of substeps continuing until the root node's data item is accessed.

24. The method of claim 22 in which the signal from the user input device indicates a starting node that is in the indicated set of nodes; the step of determining whether each of the nodes in the indicated set of nodes is at the centering line comprising:

a substep of accessing the starting node's data item to determine whether the starting node is the parent node of any other node; and if the starting node is the parent node of another node, a sequence of substeps, each substep accessing a data item represented by a node whose parent node is the node whose data item was accessed in the previous substep and determining whether the accessed data item is represented by a node that is the parent node of any other node;

the sequence of substeps continuing until a data item is accessed that is represented by a node that is not the parent node of any other node, the lowest node being the node that is not the parent node of any other node.

25. The method of claim 24 in which one of the substeps in the sequence of substeps accesses a data item represented by a node that is the parent node of a children set of two or more other nodes; the one of the substeps comprising a substep of selecting a center one of the children set of nodes as the node whose data item is accessed in the next substep in the sequence.

26. A method of operating a processor connected for providing image data to an image output device that includes a display, the image output device presenting images on the display in response to the image data; the processor further being connected for receiving signals from a user input device; the method comprising:

providing first image data so that the image output device presents a first image, the first image including a first node-link structure that is perceptible as lying on a plane-like surface; the first node-link structure including a first set of three or more nodes arranged in two or more rows with at least two nodes in one row and at least one node in a different row; the first node-link structure having a centering line across which each row extends; the first node-link structure further including a first set of two or more links, each of the first set of links being perceptible as connecting two of the first set of nodes, the two connected nodes being in different rows;

receiving a signal from the user input device indicating one of the first set of nodes in the first node-link structure;

in response to the signal from the user, automatically determining whether the indicated node is at the centering line of the first node-link structure;

if the indicated node is not at the centering line of the first node-link structure, automatically providing second image data so that the image output device presents a second image following the first image in sequence so that the first and second images are presented in succession; the second image including a second node-link structure that is perceptible as lying on a plane-like surface; the second node-link structure including a second set of three or more nodes arranged in two or more rows with at least two nodes in one row and at least one node in a different row; the second node-link structure having a centering line across which each row extends; the second node-link structure further including a second set of two or more links, each of the second set of links being perceptible as connecting two of the second set of nodes, the two connected nodes being in different rows;

each of the second set of nodes being perceptible as a continuation of a respective one of the first set of nodes; the second set of nodes including a continued indicated node that is perceptible as a continuation of the indicated node; the continued indicated node being at the centering line of the second node-link structure;

the rows of the second node-link structure being perceptible as continuations of the rows of the first node-link structure, with the indicated node's row shifted to position the continued indicated node at the centering line of the second node-link structure.

* * * * *